(12) United States Patent
Murphy et al.

(10) Patent No.: US 9,806,659 B2
(45) Date of Patent: Oct. 31, 2017

(54) INVERTER DRIVE SYSTEM, BUS BAR AND ASSEMBLY

(71) Applicant: General Electric Company, Schenectady, NY (US)

(72) Inventors: Mark Allen Murphy, Erie, PA (US); Jeffrey John Wolff, Lawrence Park, PA (US); Jason Daniel Kuttenkuler, Erie, PA (US)

(73) Assignee: General Electric Company, Schenectady, NY (US)

( * ) Notice: Subject to any disclaimer, the term of this patent is extended or adjusted under 35 U.S.C. 154(b) by 14 days.

(21) Appl. No.: 15/153,294

(22) Filed: May 12, 2016

(65) Prior Publication Data

US 2017/0179866 A1 Jun. 22, 2017

Related U.S. Application Data

(63) Continuation-in-part of application No. 29/548,719, filed on Dec. 16, 2015, now Pat. No. Des. 759,602.

(51) Int. Cl.

| H02P 27/06 | (2006.01) |
|---|---|
| H02B 1/20 | (2006.01) |
| H02M 7/00 | (2006.01) |
| H02G 5/00 | (2006.01) |
| H02M 7/44 | (2006.01) |
| B60R 16/03 | (2006.01) |

(52) U.S. Cl.
CPC .............. *H02P 27/06* (2013.01); *B60R 16/03* (2013.01); *H02B 1/20* (2013.01); *H02G 5/005* (2013.01); *H02M 7/003* (2013.01); *H02M 7/44* (2013.01)

(58) Field of Classification Search
CPC .......... H02P 27/06; H02B 1/20; H02M 7/003; H02M 7/44; B60R 16/03; H02G 5/005
USPC .......................................... 361/637, 688–723
See application file for complete search history.

(56) References Cited

U.S. PATENT DOCUMENTS

| 6,701,880 | B1 * | 3/2004 | Gauthier | .................. B60K 6/28 |
| | | | | 123/179.3 |
| 7,710,723 | B2 * | 5/2010 | Korich | ............... H05K 7/20927 |
| | | | | 165/104.33 |
| 8,072,758 | B2 * | 12/2011 | Groppo | .............. H05K 7/20927 |
| | | | | 165/104.33 |
| 2002/0034087 | A1 * | 3/2002 | Suzuki | .................. H02M 7/003 |
| | | | | 363/144 |

* cited by examiner

*Primary Examiner* — Anthony Haughton
*Assistant Examiner* — Yahya Ahmad
(74) *Attorney, Agent, or Firm* — Global Patent Operation; John A. Kramer

(57) ABSTRACT

An inverter drive assembly includes a first bus bar having a plurality of bushings, including at least a first bushing and a second bushing, the first bus bar being configured to receive at least one DC link capacitor of the inverter drive assembly via the second bushing, a second bus bar electrically connected to the first bus bar at the first bushing, and an inverter electrically connected to the second bus bar, the inverter being configured to receive electrical current through the second bus bar, wherein a height of the first bushing defines an air gap of approximately 5 millimeters between the first bus bar and the second bus bar.

19 Claims, 9 Drawing Sheets

INVERTER DRIVE SYSTEM, BUS BAR AND ASSEMBLY

FIELD OF THE INVENTION

Embodiments of the invention relate generally to inverter drive assemblies. Other embodiments relate to a bus bar of inverter drive assembly for an electric vehicle.

BACKGROUND OF THE INVENTION

Traction vehicles (such as, for example, locomotives and other off-highway vehicles ("OHVs")) may employ electric traction motors for driving wheels of the vehicles. In some of these vehicles, the motors are alternating current (AC) motors whose speed and power are controlled by varying the frequency and current of AC electric power supplied to the motors. Commonly, the electric power is supplied at some point in the vehicle system as direct current power and is thereafter inverted to AC power of controlled frequency and amplitude. The electric power may be derived from an on-board alternator driven by an internal combustion engine or may be obtained from a wayside power source such as a third rail or overhead catenary.

In conventional systems the power is inverted in a solid-state inverter incorporating a plurality of diodes and electronic switching devices. In a locomotive, other large OHV, or transit application, the traction motors may develop more than 1000 horsepower per motor thus requiring very high power handling capability by the associated inverter. This, in turn, requires the use of semiconductor switching devices such as GTOs (gate turn-off thyristors) or IGBTs which are capable of controlling such high power and of dissipating significant heat developed in the semiconductor devices due to internal loss generating characteristics.

The semiconductor devices are typically mounted on heat transfer devices such as heat sinks which aid in transferring heat away from the semiconductor devices and thus preventing thermal failure of the devices. An electrical circuit area in which the semiconductors devices are located may include the various control and timing circuits, including low power semiconductors, used in controlling switching of the power semiconductors.

In an OHV, an inverter drive system for large AC motor applications typically includes an inverter associated with each traction motor. A conventional design for power inverters may include a layered bus bar array which interconnects semiconductor device (e.g., IGBT) modules and several DC link capacitors. In particular, a plurality of DC link capacitors are typically connected to the inverters through an arrangement of bus bars including a horizontal, capacitor bus bar that receives a plurality of DC link capacitors and which is coupled to a vertical, interconnecting bus bar. The vertical, interconnecting bus bar is coupled at a distal end to IGBT modules of the inverters.

Known bus bar designs for high power applications, while generally suitable for what is regarded as ordinary performance, may benefit from modified design. In particular, certain existing designs may be prone to corona discharge in the area where the vertical bus bar of the inverters is coupled to the horizontal bus bar, which can lead to insulation degradation and ultimately short circuits.

BRIEF DESCRIPTION OF THE INVENTION

In an embodiment, an inverter drive assembly includes a first bus bar, a second bus bar, and an inverter. The first bus bar has a plurality of bushings, including at least a first bushing and a second bushing, and is configured to receive at least one DC link capacitor of the inverter drive assembly via the second bushing. The second bus bar is electrically connected to the first bus bar at the first bushing. The inverter is electrically connected to the second bus bar, and is configured to receive electrical current through the second bus bar. A height of the first bushing defines an air gap of approximately 5 millimeters between the first bus bar and the second bus bar.

In an embodiment, a bus bar for an inverter drive assembly of a vehicle includes a first layer, a second layer laminated to the first layer, at least one first bushing configured to receive a capacitor, and at least one second bushing configured to receive an inverter bus bar connected to an inverter of the inverter drive assembly. The at least one second bushing is approximately 5 millimeters in height. Also, the first layer and the second layer substantially entirely overlap.

In an embodiment, a method (e.g., method for an inverter drive assembly) includes the steps of providing a first bus bar, and connecting a second bus bar having a conductor to the first bus bar to define an air gap between the first bus bar and the second bus bar. The air gap is substantially 5 millimeters.

BRIEF DESCRIPTION OF THE DRAWINGS

The present invention will be better understood from reading the following description of non-limiting embodiments, with reference to the attached drawings, wherein below.

DETAILED DESCRIPTION OF THE INVENTION

Figure 1:
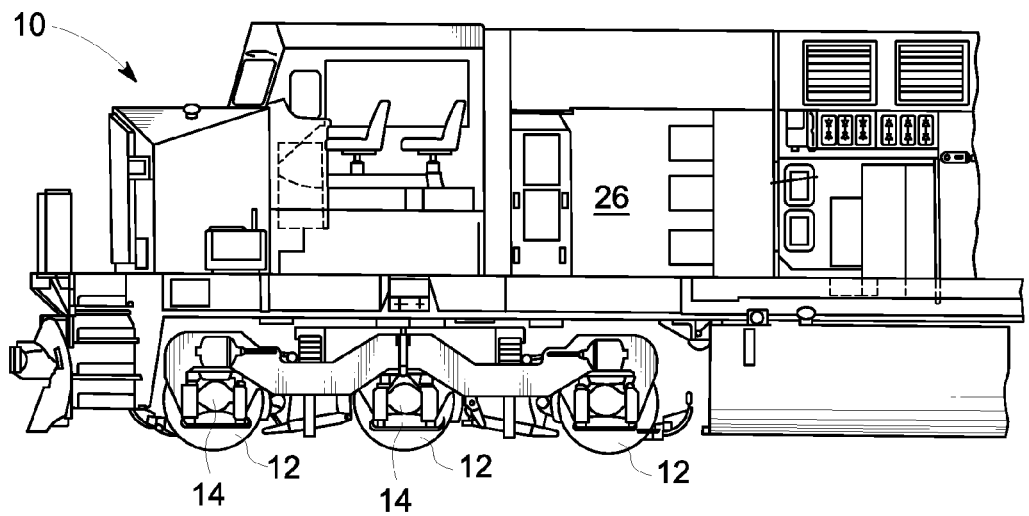
FIG. 1 is a simplified, partial schematic representation of a locomotive.

Reference will be made below in detail to exemplary embodiments of the invention, examples of which are illustrated in the accompanying drawings. Wherever possible, the same reference characters used throughout the drawings refer to the same or like parts, without duplicative description. Although exemplary embodiments of the present invention are described with respect to an inverter drive assembly for a locomotive or OHV, embodiments of the invention are also applicable for use with electric machinery and vehicles, generally, such as machinery that utilizes electric motors such as AC or DC motors. As used herein, "electrical contact," "electrical communication" and "electrically coupled" means that the referenced elements are directly or indirectly connected such that an electrical current may flow from one to the other. The connection may include a direct conductive connection (i.e., without an intervening capacitive, inductive or active element), an inductive connection, a capacitive connection, and/or any other suitable electrical connection. Intervening components may be present.

Before turning to the present invention, reference is first made to FIG. 1, which illustrates a simplified, partial cross-sectional view of an electric traction vehicle 10 illustrated as a locomotive. Although a locomotive is shown in FIGS. 1 and 2, the present invention is also applicable to traction systems wherein power is received from an external power generation source and distributed via a catenary or third rail, as well as to electric machinery that utilizes electric motors, more generally.

The locomotive 10 of FIG. 1 includes a plurality of traction motors, not visible in the figure but located behind the drive wheels 12 and coupled in driving relationship to axles 14. The motors are preferably alternating current (AC) electric motors and the locomotive includes a plurality of electrical inverter circuits for controlling electrical power to the motors.

Figure 2:
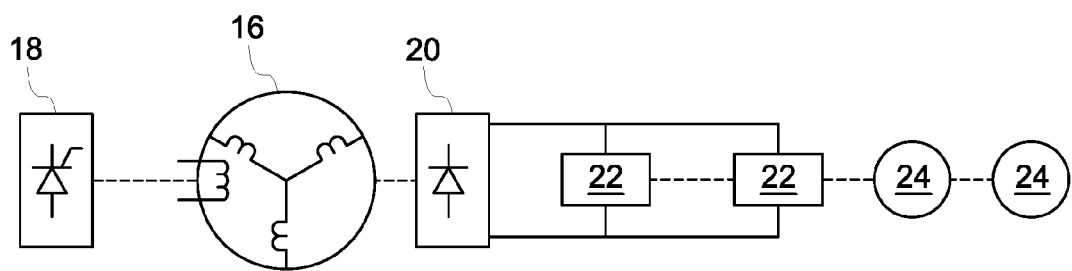
FIG. 2 is a simplified schematic representation of a power circuit for a vehicle.
Figure 3:
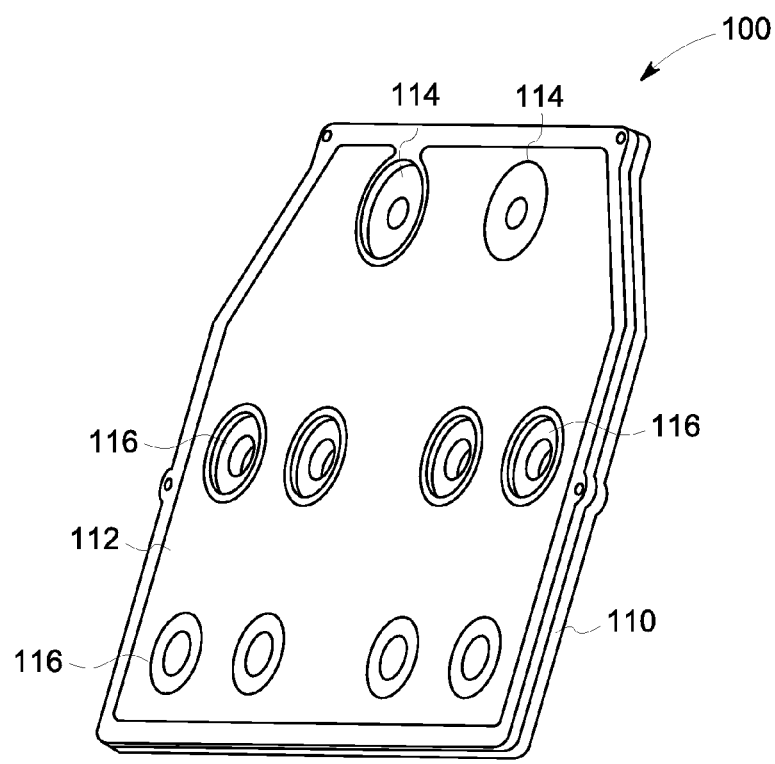
FIG. 3 is bottom, perspective view of a bus bar according to an embodiment of the invention.
Figure 4:
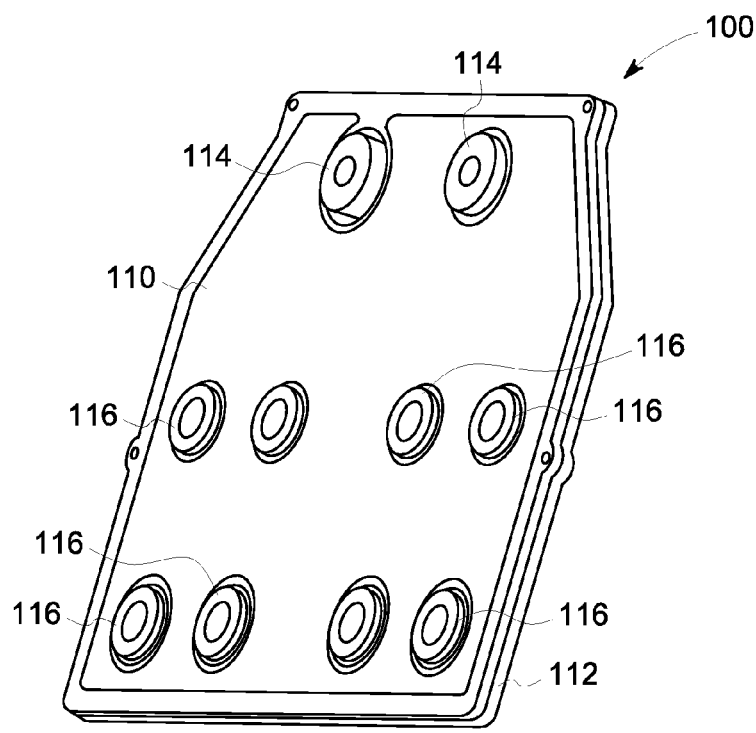
FIG. 4 is a top, perspective view of the bus bar of FIG. 3.
Figure 5:
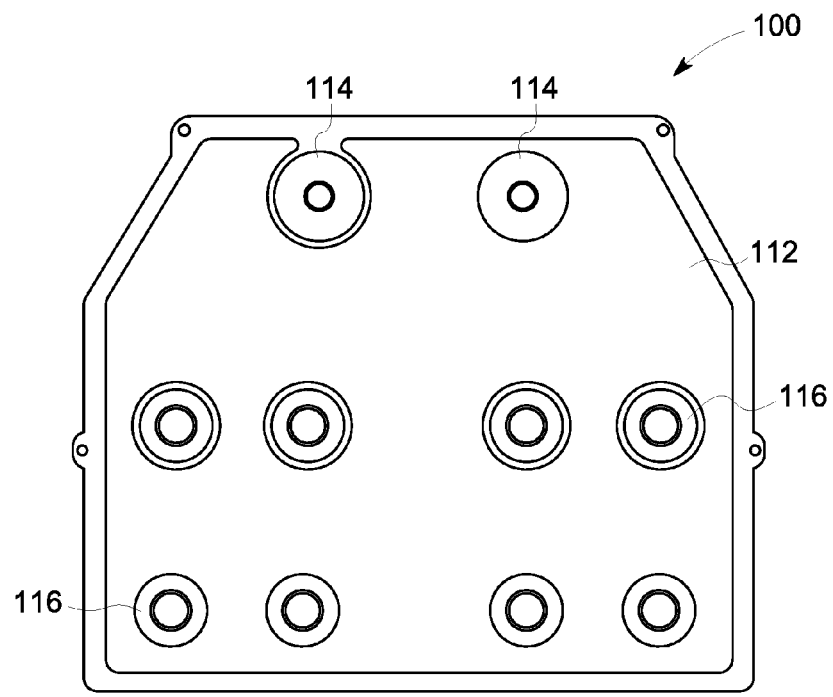
FIG. 5 is bottom plan view of the bus bar of FIG. 3.
Figure 6:
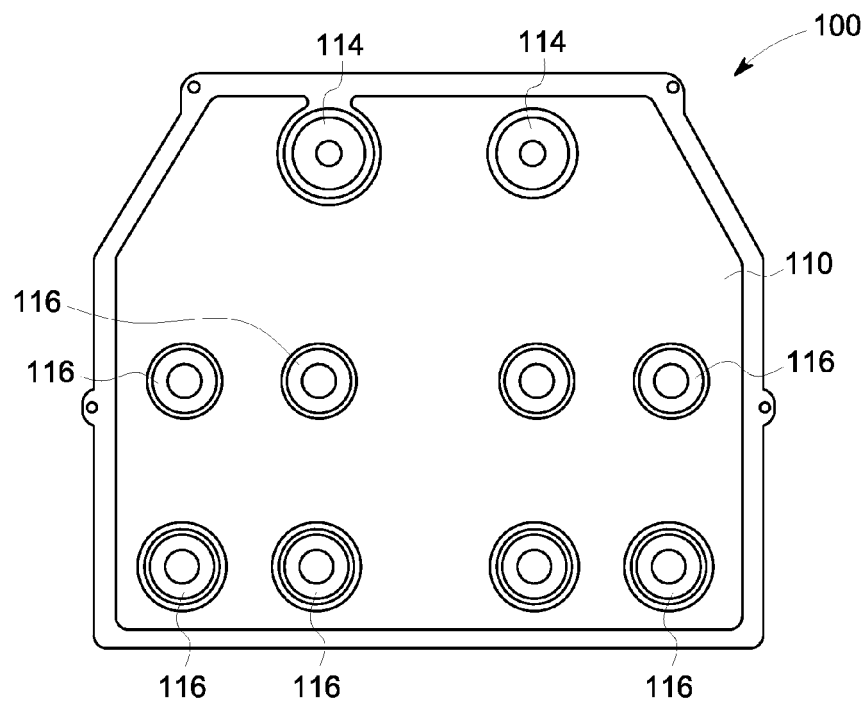
FIG. 6 is a top plan view of the bus bar of FIG. 3.

FIG. 2 illustrates a simplified schematic representation of the electrical traction system for locomotive 10 including an alternator 16 driven by an on-board internal combustion engine such as a diesel engine (not shown). Power output of the alternator 16 is regulated in a well-known manner by field excitation control indicated by block 18. Electrical power from alternator 16 is rectified, block 20, and coupled to inverters 22. Inverters 22 use high power semiconductor switching devices such as IGBTs or GTOs to convert the rectified power to variable frequency, variable amplitude power for application to AC motors 24.

Referring again to FIG. 1, electrical power circuits are at least partially located in an inverter drive assembly compartment or envelope 26. Within envelope 26, the high power semiconductor devices (not shown in FIG. 1) are mounted to air cooled heat sinks. The control electronics for the inverters 22 and field control 18 as well as other electronic components are packaged in a conventional manner on circuit boards held in racks in envelope 26. Mounted outside compartment 26 are one or more blowers (now shown) which provide air cooling for the electrical compartment and the heat sinks.

Generally speaking, during operation, alternating current is fed to the inverter drive assembly from an alternator (not shown) via AC bus bars. Rectifiers are configured to convert the alternating current to direct current, which is then fed through to a horizontal, capacitor bus bar, and ultimately to DC link capacitors connected to the horizontal bus bar. The capacitors are configured to supply the direct current to inverter modules (not shown) that are mounted to a vertical bus bar which is, itself, connected to the horizontal, capacitor bus bar in a manner heretofore known in the art. The direct current is then inverted to AC power of controlled frequency and amplitude and supplied to the traction motors of the vehicle 10. (As used herein, in one aspect, "vertical" and "horizontal" refer to parts/elements that are perpendicular to one another. In another aspect, they refer to parts that when installed in a vehicle and the vehicle is operably disposed on a level route surface, the parts (e.g., as defined by a long axis of the part) are normal to the surface and parallel to the surface, respectively.)

Turning now to FIGS. 3-8, various views of the horizontal, capacitor bus bar 100 according to an embodiment of the present invention are illustrated. As shown therein, the capacitor bus bar 100 is generally rectangular in shape and is of a laminated construction, having a plurality of layers including a first layer 110 and a second layer 112. The first and second layers substantially entirely overlap. As used herein, "substantially entirely overlap" means that the layers have substantially the same surface area and that the layers are in stacked registration such that only a narrow area of one layer is not in registration with the other layer. In an embodiment, the non-registered area of one layer may be about less than about 0-10% of the entire surface area of the layer (such that about 90% to 100% of the surface area of the respective layers overlap) and, more particularly, about 0% to 5% of the entire surface area of the layer (such that about 95% to 100% of the surface area of the respective layers overlap). In an embodiment, the layers entirely overlap such that no portion one layer protrudes from the other.

Figure 7:
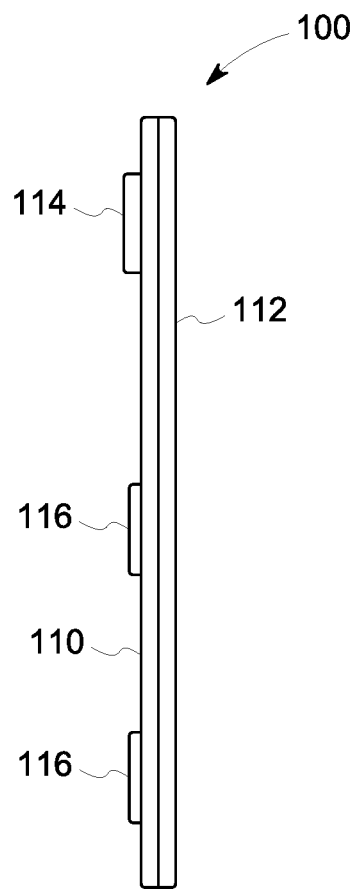
FIG. 7 a right side elevational view of the bus bar of FIG. 3.
Figure 8:
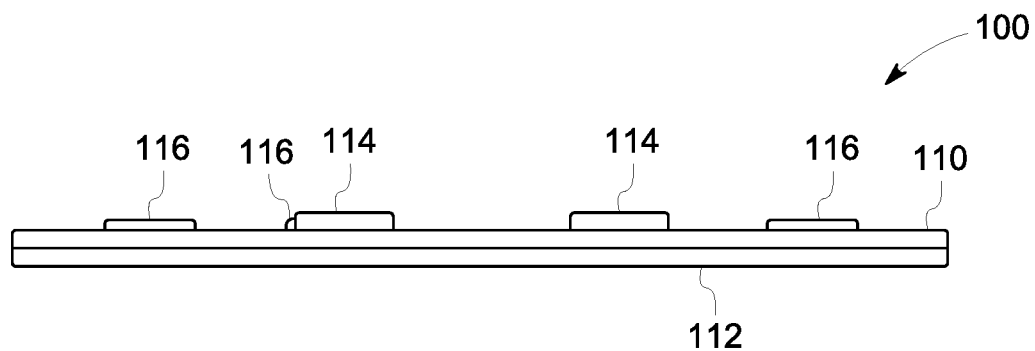
FIG. 8 is a front elevational view of the bus bar of FIG. 3.
Figure 9:
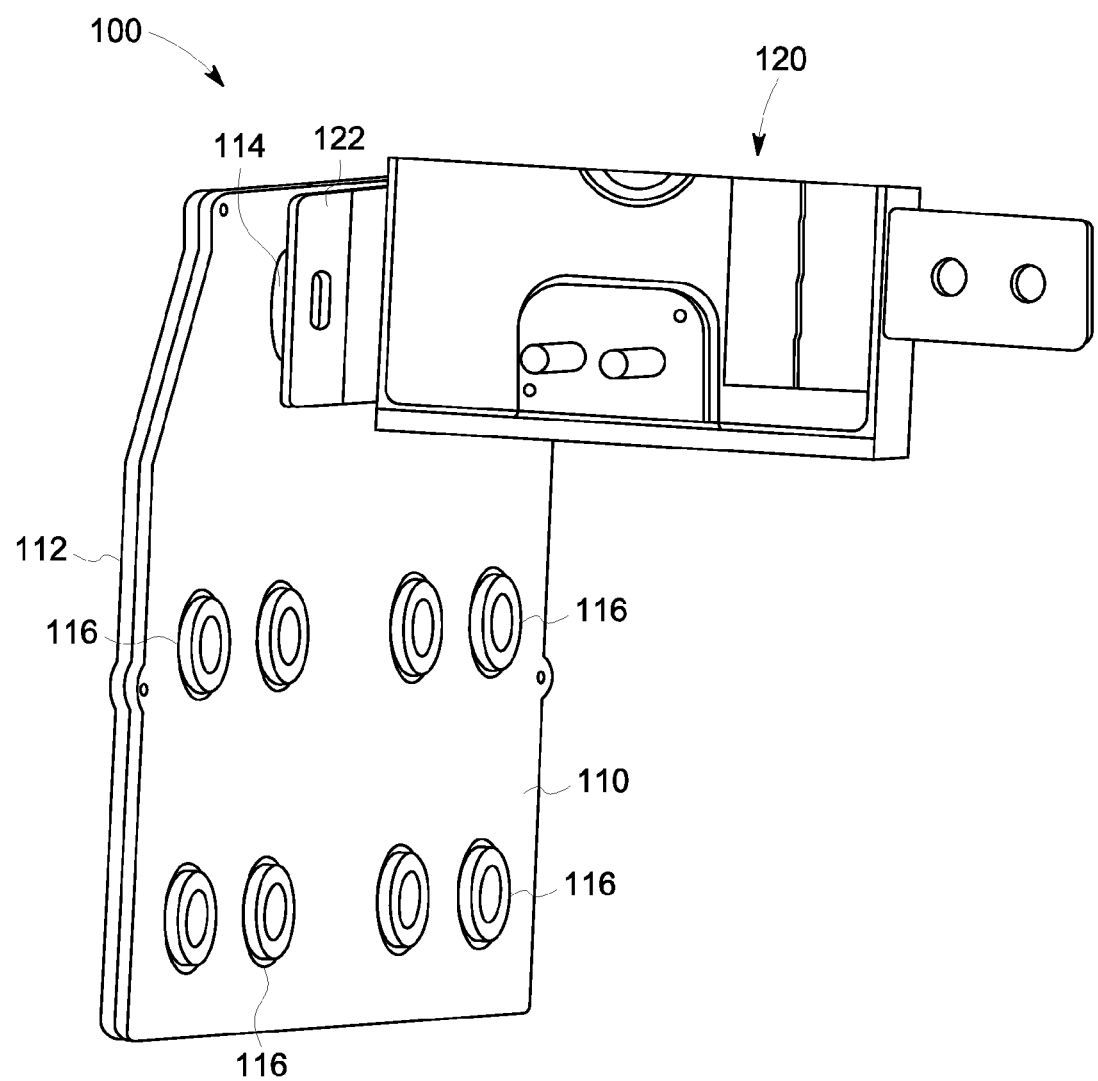
FIG. 9 is a left side perspective view of the bus bar of FIG. 3, shown with a vertical bus bar coupled thereto.
Figure 10:
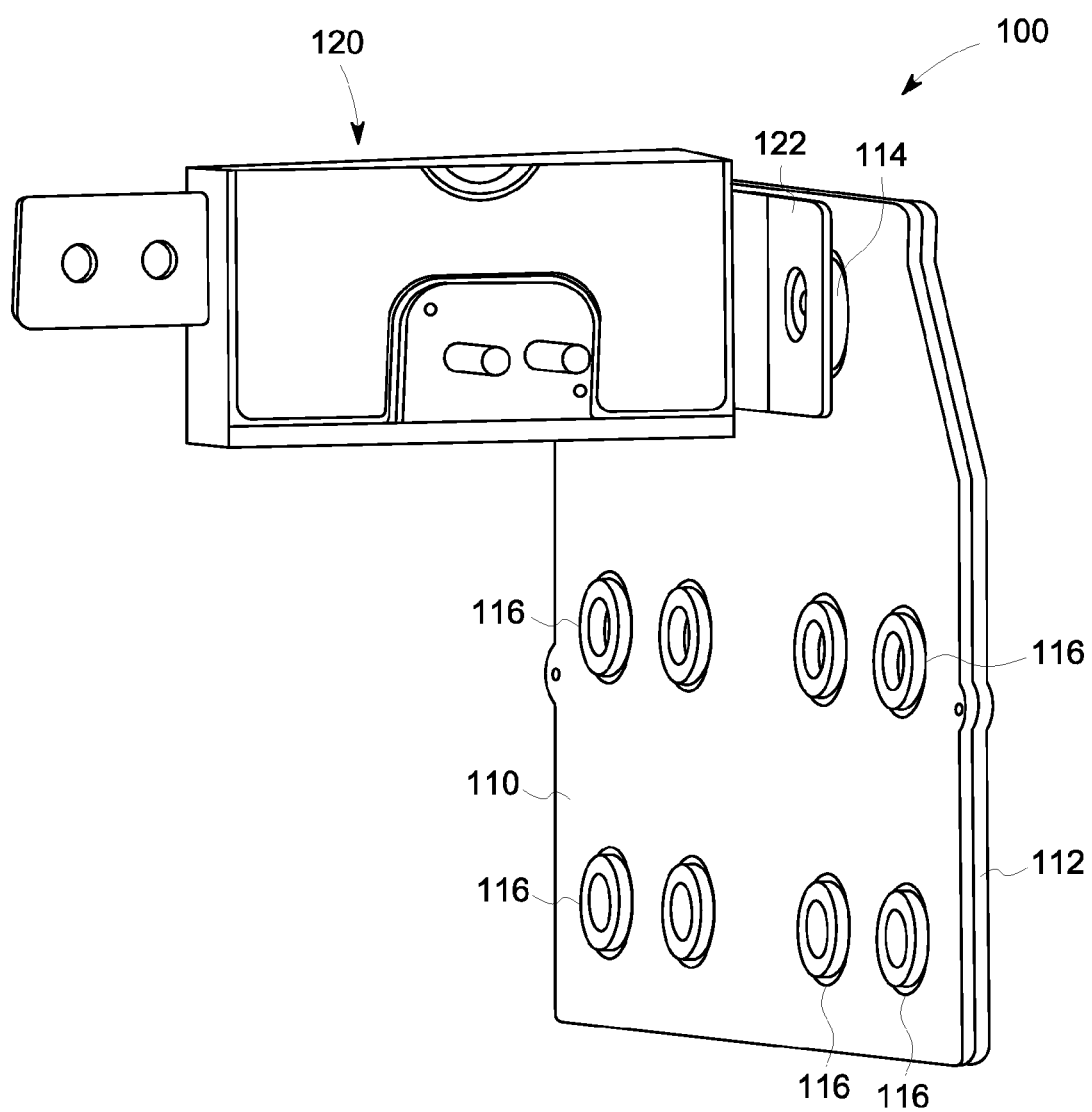
FIG. 10 is a right side perspective view of the bus bar of FIG. 3, shown with a vertical bus bar coupled thereto.
Figure 11:
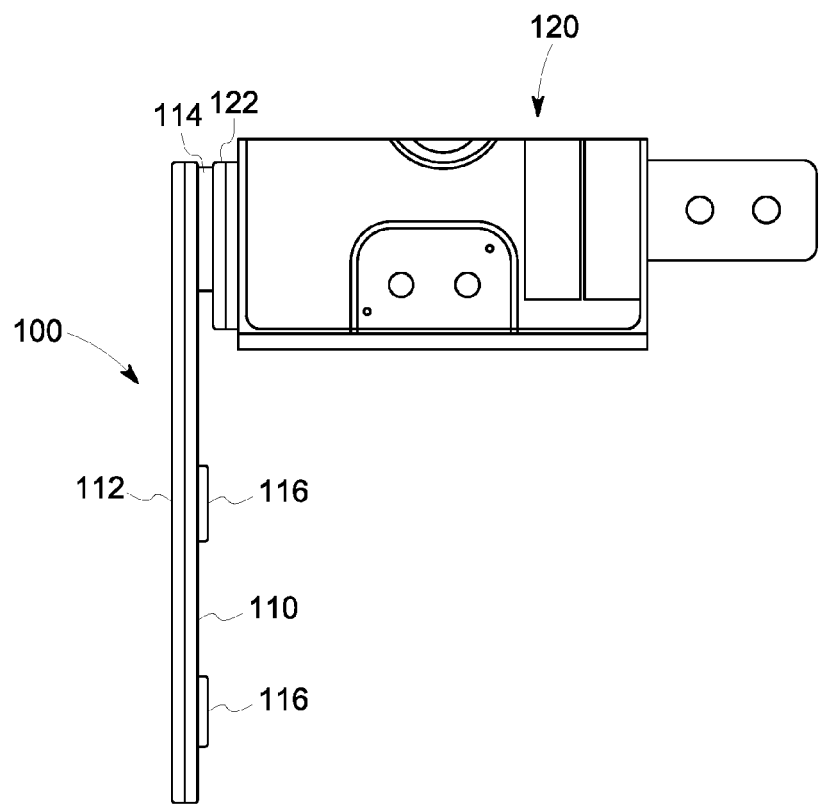
FIG. 11 is a left side elevational view of the bus bar of FIG. 3, shown with a vertical bus bar coupled thereto.
Figure 12:
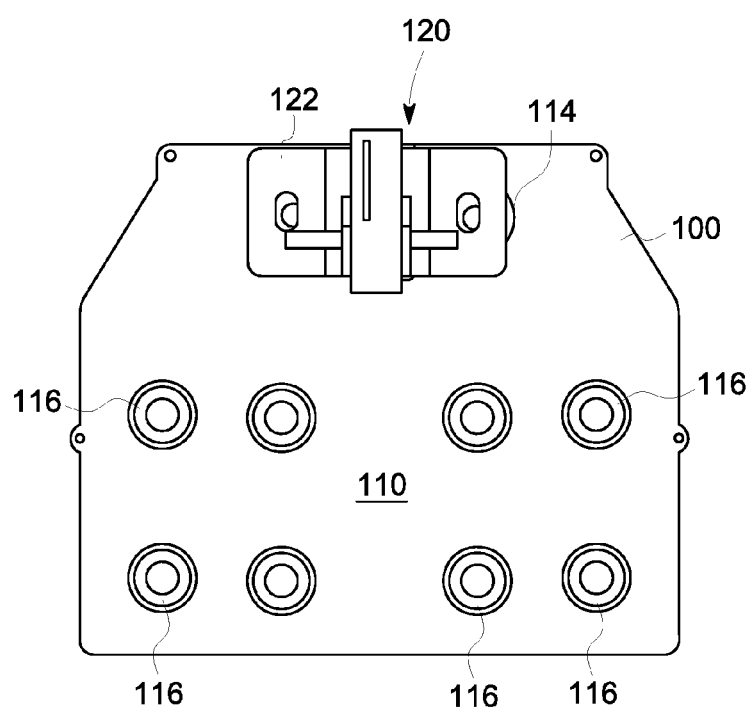
FIG. 12 is a top plan view of the bus bar of FIG. 3, shown with a vertical bus bar coupled thereto.
Figure 13:
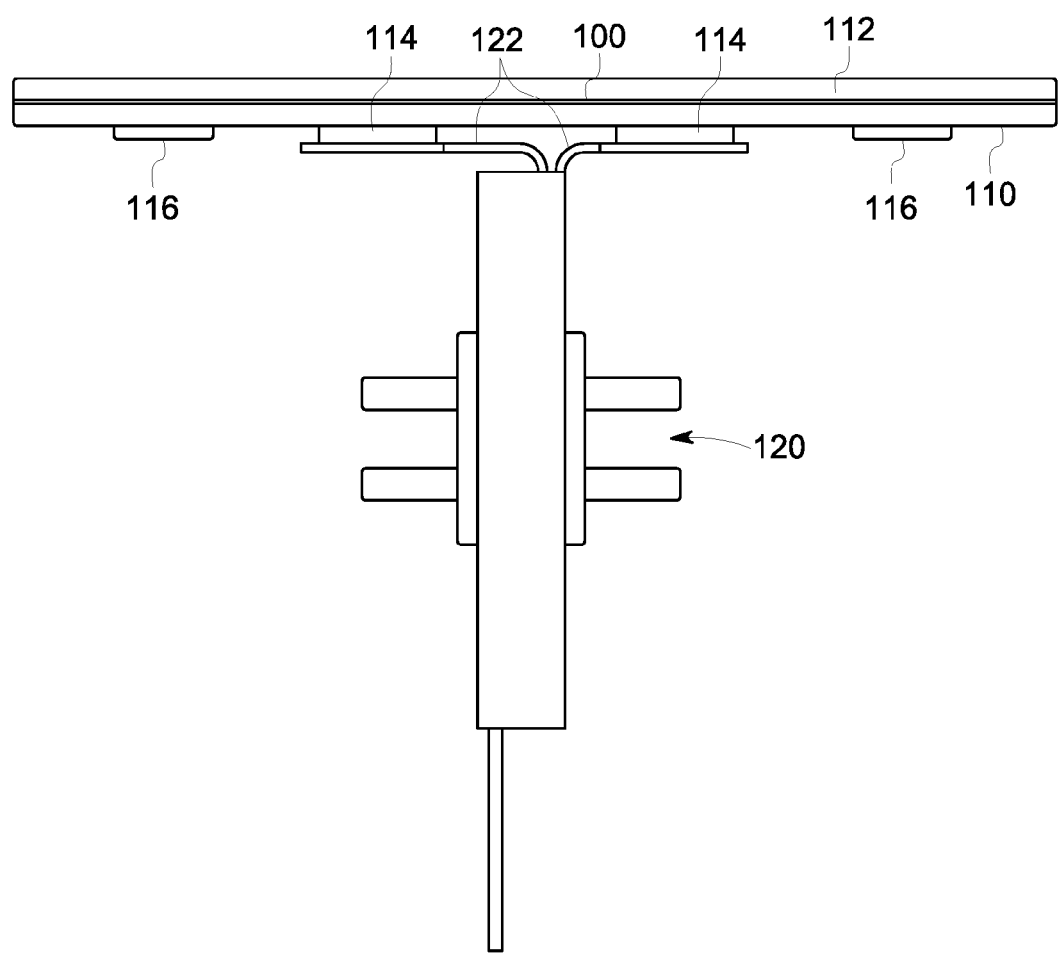
FIG. 13 is a rear elevational view of the bus bar of FIG. 3, shown with a vertical bus bar coupled thereto.

The bus bar 100 includes a plurality of vias, arranged in rows, including first vias 114 and second vias 116. For example, vias 114, 116 are configured as bushings for receiving threaded fasteners, such as cap screws (not shown) for electrically connecting the bus bar 100 with capacitors, other bus bars and/or other components of the inverter drive system. As best illustrated in FIGS. 7 and 8, the first vias or bushings 114 extend above the first layer 110 or surface of the bus bar 100 to a greater extent than the second vias 116. That is, the first bushings 114 are taller than the second bushings 116.

Referring now to FIGS. 9-13, in an embodiment, the first bushings 114 are configured to facilitate the coupling of a vertical bus bar 120 to the horizontal, capacitor bus bar 100. As discussed above, the vertical bus bar 120 connects to the inverters of the drive assembly for transferring DC electrical power from the DC link capacitors to the inverters, where it is converted to AC electrical power for use by the traction motors. As illustrated therein, the vertical bus bar may take the form of any bus bar generally known in the art, and includes a bare conductor 122 that is electrically and mechanically coupled to the first bushings 114 of the horizontal, capacitor bus bar 100 by threaded fasteners 124.

Figure 14:
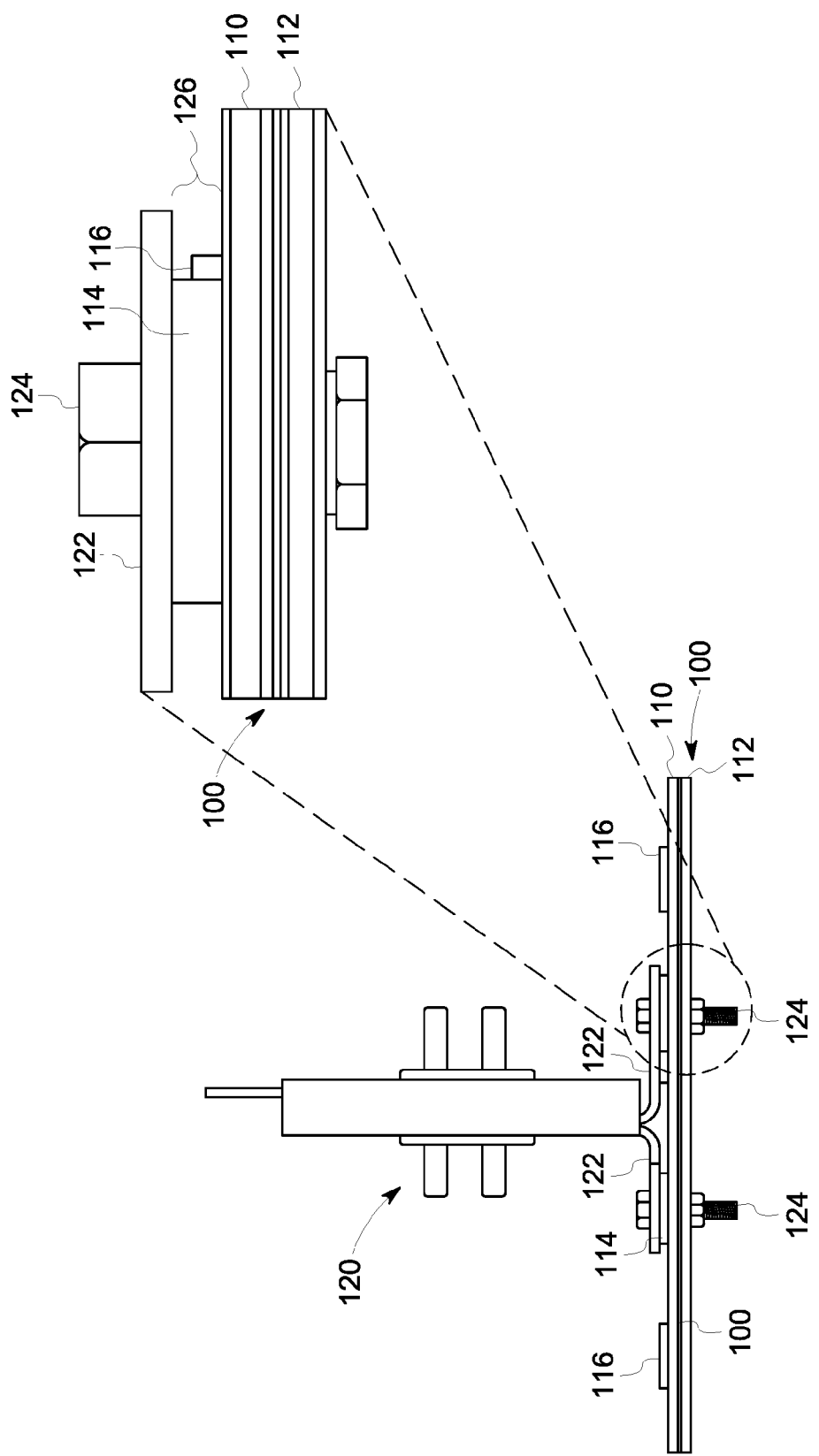
FIG. 14 is a detail view illustrating an air gap between the bus bar of FIG. 3 and a vertical bus bar coupled thereto.

As best shown in FIG. 14, the height of the first bushings 114 define an air gap 126 between the surface of the first layer 110 of the horizontal bus bar 100 and the bare conductor 122 of the vertical bus bar 120. In an embodiment, the first bushings 114 are approximately 5 millimeters tall, defining an air gap 126 of 5 millimeters between the bar conductor 126 and the bus bar 100. As used herein, in an embodiment, "approximately" means plus or minus 10%.

In an embodiment, the second bushings 116 are approximately 1.8 millimeters tall. The bushings 114 are therefore approximately 3.2 millimeters taller than the bushings 116. In an embodiment, the first bushings 114 are substantially exactly 5 millimeters tall, defining the air gap 126 that is substantially exactly 5 millimeters wide.

This air gap of 5 millimeters between the conductor 122 of the vertical bus bar 120 and the top layer 110 of the horizontal bus bar 100 is in contrast to the much narrower gap of existing designs, which may typically be on the order of approximately 1.8 millimeters (resulting from a standard bushing height of 1.8 millimeters). The bushings 114 of the bus bar 100 are therefore almost three times taller than the bushings of standard bus bars.

This larger air gap, at substantially 5 millimeters, has been found to increase the reliability of the bus bar 100 by reducing the likelihood of corona between the bus bar 100 and the bare conductor 122, while at the same time keeping inductance below undesirable levels by providing substantially full overlap between the first layer 110 and the second layer 112 of the bus bar 100. (The height cannot be increased to just any height because inductance may be increased to a point where proper electrical function is compromised.) The increased overlap between the two DC layers 110, 112 as compared to existing designs also serves to decrease inductance while at the same time decreasing the likelihood of corona. In particular, existing horizontal bus bars having standard height bushings (i.e., approximately 1.8 millimeters tall) may have an increased likelihood of corona occurring between the horizontal bus bar and the bar copper conductor of the vertical bus bar. In existing designs, this corona can eventually degrade the insulation of the bus bar, potentially resulting in short circuits. The bus bar 100, by providing bushings 114 with increased height, coupled with substantial overlap between the two layers 110, 112, substantially obviates this issue, while maintaining desired electrical performance.

In an embodiment, the bus bar 100 having a bushing height of 5 millimeters, thereby defining an air gap of 5 millimeters, is particularly applicable for 1200-1500 volt nominal DC link voltages. In an embodiment, the bus bar 100 is particularly applicable to the drive system of an OHV having a 1200-1550 volt nominal link voltage. During testing, it has been discovered that the average field in the air gap defined by a bus bar with standard height bushings (e.g., approximately 1.8 millimeters) is approximately 800V/mm (1000V/mm with 0.5 mm of insulation on the bus bar). The average field in the air gap defined by the increased bushing height of the bus bar 100 of the present invention, however, is only 300V/mm.

In an embodiment, an inverter drive assembly is provided. The assembly includes a first bus bar having a plurality of bushings, including at least a first bushing and a second bushing, the first bus bar being configured to receive at least one DC link capacitor of the inverter drive assembly via the second bushing, a second bus bar electrically connected to the first bus bar at the first bushing, and an inverter electrically connected to the second bus bar, the inverter being configured to receive electrical current through the second bus bar, wherein a height of the first bushing defines an air gap of approximately 5 millimeters between the first bus bar and the second bus bar. In an embodiment, the height of the first bushing is approximately 5 millimeters. In an embodiment, a height of the second bushing is approximately 1.8 millimeters. In an embodiment, the second bus bar includes a conductor that is secured to the first bushing of the first bus bar, and the air gap is defined by a lower surface of the conductor and an upper surface of the first bus bar. In an embodiment, the first bus bar and second bus bar are oriented substantially perpendicular to one another. In an embodiment, the inverter drive assembly is installed on an off-highway vehicle. In an embodiment, the at least one first bushing is a pair of first bushings. In an embodiment, the first bus bar is a laminated bus bar having a first layer and a second layer.

In another embodiment, a bus bar for an inverter drive assembly of a vehicle is provided. The bus bar includes a first layer, a second layer laminated to the first layer, at least one first bushing configured to receive a capacitor, and at least one second bushing configured to receive an inverter bus bar connected to an inverter of the inverter drive assembly, wherein the at least one second bushing is approximately 5 millimeters in height. In an embodiment, the height of the second bushing defines an air gap between the first layer and a conductor of the inverter bus bar. In an embodiment, the air gap is approximately 5 millimeters in height. In an embodiment, the at least one first bushing is approximately 1.8 millimeters in height. In an embodiment, the vehicle is an off-highway vehicle. In another embodiment, the vehicle is a locomotive. In an embodiment, the inverter bus bar is oriented substantially perpendicular to the bus bar.

In yet another embodiment, a method is provided. The method includes the steps of providing a first bus bar, connecting a second bus bar having a conductor to the first bus bar to define an air gap between the first bus bar and the second bus bar, wherein the air gap is substantially 5 millimeters. In an embodiment, the first bus bar includes a first bushing having a height of substantially 5 millimeters, the second bus bar includes a conductor electrically connected to the first bushing, and the air gap is the space between the first bus bar and the conductor. In an embodiment, the method may also include the steps of connecting the second bus bar to an inverter and connecting the first bus bar to a capacitor. In an embodiment, the first bus bar includes a second bushing having a height of approximately 1.8 millimeters.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The terms "including" and "in which" are used as the plain-English equivalents of the respective terms "comprising" and "wherein." Moreover, the terms "first," "second," "third," "upper," "lower," "bottom," "top," etc. are used merely as labels, and are not intended to impose numerical or positional requirements on their objects.

This written description uses examples to disclose several embodiments of the invention, including the best mode, and also to enable one of ordinary skill in the art to practice the embodiments of invention, including making and using any devices or systems and performing any incorporated methods.

As used herein, an element or step recited in the singular and proceeded with the word "a" or "an" should be understood as not excluding plural of the elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the embodiments described herein without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. An inverter drive assembly, comprising:
a first bus bar having a plurality of bushings, including at least a first bushing and a second bushing, the first bus bar being configured to receive at least one DC link capacitor of the inverter drive assembly via the second bushing;
a second bus bar electrically connected to the first bus bar at the first bushing; and
an inverter electrically connected to the second bus bar, the inverter being configured to receive electrical current through the second bus bar;
wherein a height of the first bushing defines an air gap of approximately 5 millimeters between the first bus bar and the second bus bar.

2. The inverter drive assembly of claim 1, wherein:
the height of the first bushing is approximately 5 millimeters.

3. The inverter drive assembly of claim 2, wherein:
a height of the second bushing is approximately 1.8 millimeters.

4. The inverter drive assembly of claim 2, wherein:
the second bus bar includes a conductor that is secured to the first bushing of the first bus bar; and
the air gap is defined by a lower surface of the conductor and an upper surface of the first bus bar.

5. The inverter drive assembly of claim 4, wherein:
the first bus bar and second bus bar are oriented substantially perpendicular to one another.

6. The inverter drive assembly of claim 4, wherein:
the inverter drive assembly is installed on an off-highway vehicle.

7. The inverter drive assembly of claim 4, wherein:
the at least one first bushing is a pair of first bushings.

8. The inverter drive assembly of claim 4, wherein:
the first bus bar is a laminated bus bar having a first layer and a second layer;
wherein the first layer and the second layer substantially entirely overlap.

9. A bus bar for an inverter drive assembly of a vehicle, comprising:
a first layer;
a second layer laminated to the first layer;
at least one first bushing configured to receive a capacitor; and
at least one second bushing configured to receive an inverter bus bar connected to an inverter of the inverter drive assembly;
wherein the at least one second bushing is approximately 5 millimeters in height; and
wherein the first layer and the second layer substantially entirely overlap.

10. The bus bar of claim 9, wherein:
the height of the second bushing defines an air gap between the first layer and a conductor of the inverter bus bar.

11. The bus bar of claim 10, wherein:
the air gap is approximately 5 millimeters in height.

12. The bus bar of claim 9, wherein:
the at least one first bushing is approximately 1.8 millimeters in height.

13. The bus bar of claim 9, wherein:
the bus bar is installed in the vehicle, and the vehicle is an off-highway vehicle.

14. The bus bar of claim 13, wherein:
the off-highway vehicle is a locomotive.

15. The bus bar of claim 10, wherein:
the at least one second bushing is configured to receive the inverter bus bar at a substantially perpendicular orientation to the bus bar.

16. A method comprising:
providing a first bus bar; and
connecting a second bus bar having a conductor to the first bus bar to define an air gap between the first bus bar and the second bus bar;
wherein the air gap is substantially 5 millimeters.

17. The method according to claim 16, wherein:
the first bus bar includes a first bushing having a height of substantially 5 millimeters; and
the second bus bar includes a conductor electrically connected to the first bushing;
wherein the air gap is the space between the first bus bar and the conductor.

18. The method according to claim 16, further comprising:
connecting the second bus bar to an inverter; and
connecting the first bus bar to a capacitor.

19. The method according to claim 16, wherein:
the first bus bar includes a second bushing having a height of approximately 1.8 millimeters.

* * * * *